(12) United States Patent
Morris

(10) Patent No.: US 6,519,984 B1
(45) Date of Patent: Feb. 18, 2003

(54) LOCK FOR A SLIDING WINDOW

(76) Inventor: Michael Morris, 28 Burns St., Indooroopilly Q 4068 (AU)

(*) Notice: Subject to any disclaimer, the term of this patent is extended or adjusted under 35 U.S.C. 154(b) by 0 days.

(21) Appl. No.: 09/609,943

(22) Filed: Jul. 3, 2000

(51) Int. Cl.[7] .............................................. B60R 25/02
(52) U.S. Cl. ........................... 70/210; 70/215; 70/224; 70/208; 70/99; 70/89; 292/336.3
(58) Field of Search ................................. 70/89, 90, 95, 70/99, 100, 210, 215, 217, 224, 208, 209; 292/336.3, 359, 347, 348, DIG. 31, 73

(56) References Cited

U.S. PATENT DOCUMENTS

| | | | | |
|---|---|---|---|---|
| 4,050,272 A | * | 9/1977 | Tanaka | 70/100 |
| 4,231,597 A | * | 11/1980 | Pelcin | 292/DIG. 31 X |
| 4,554,807 A | * | 11/1985 | Dolejs | 70/208 |
| 4,631,937 A | * | 12/1986 | Debus et al. | 292/336.3 X |
| 4,643,005 A | * | 2/1987 | Logas | 70/95 |
| 4,650,230 A | * | 3/1987 | Takasaki | 70/208 X |
| 4,704,882 A | * | 11/1987 | Takasaki | 70/215 |
| 4,991,414 A | * | 2/1991 | Moore et al. | 70/215 |
| 5,092,144 A | * | 3/1992 | Fleming et al. | 70/95 |
| 5,318,333 A | * | 6/1994 | Dreifert | 292/336.3 |
| 5,347,834 A | * | 9/1994 | Ramsauer | 70/210 X |
| 5,490,404 A | * | 2/1996 | Yamada | 70/210 |
| 5,492,380 A | * | 2/1996 | Smallegan et al. | 292/336.3 |
| 5,496,082 A | * | 3/1996 | Zuckerman | 292/336.3 |
| 5,544,507 A | * | 8/1996 | Lin | 70/224 X |
| 5,561,994 A | * | 10/1996 | Smith et al. | 70/99 |
| 5,634,357 A | * | 6/1997 | Nutter et al. | 70/210 |
| 5,657,653 A | * | 8/1997 | Hensley et al. | 70/224 |
| 5,658,026 A | * | 8/1997 | Nigro, Jr. et al. | 292/336.3 |
| 5,862,690 A | * | 1/1999 | Jancsek | 70/224 |
| 5,873,274 A | * | 2/1999 | Sauerland | 70/215 X |
| 6,053,018 A | * | 4/2000 | Ramsauer | 70/215 X |
| 6,068,308 A | * | 5/2000 | Molzer | 292/336.3 |

* cited by examiner

Primary Examiner—Suzanne Dino Barrett
(74) Attorney, Agent, or Firm—Hoffman, Wasson & Gitler, PC

(57) ABSTRACT

A lock for a sliding window, the lock having a lock body, a pivoting handle attached to the lock body, the handle having a projection which extends into the lock body, an actuating lever fixed on the projection such that the actuating lever pivots with the handle, a separate lock tongue which extends from one edge of the window, and which is slidably moveable on the window in an up and down manner between a locked position where the lock tongue engages with a strike, and a free position, biasing means to bias the lock tongue into a naturally locked position, the actuating lever being operatively engageable to the lock tongue such that operation of the handle causes the lock tongue to move to the unlocked position against the bias of the biasing means.

11 Claims, 6 Drawing Sheets

LOCK FOR A SLIDING WINDOW

FIELD OF THE INVENTION

This invention relates to a lock for a sliding window which could also be used as a lock for a sliding door.

BACKGROUND ART

Locks for sliding doors are well-known and many different lock designs are available in the marketplace.

A disadvantage with current locks is that they are difficult to easily modify to encompass various locking functions.

For instance, it is desirable to have a basic lock mechanism but which can easily be modified or added to, to include a latching only function, a latching and locking function with a key, a latching and locking function with a turnbutton, a latching, turnbutton locking and key deadlocking function, and an arrangement which can have some or all of the above features together with a vent lock mechanism.

OBJECT OF THE INVENTION

The present invention is directed to a lock which has a basic novel mechanism but which can be readily added to or modified to allow the lock to have a number of functions depending on the needs of the customer.

It is an object to provide a lock which may overcome the abovementioned disadvantages or provide the public with a useful or commercial choice.

In one form of the invention, there is provided a lock for a sliding window, the lock having:
- a lock body,
- a pivoting handle attached to the lock body, the handle having a projection which extends into the lock body,
- an actuating lever fixed on the projection such that the actuating lever pivots with the handle,
- a lock tongue which is moveable between a locked position where the lock tongue engages with a strike, and a free position,
- biasing means to bias the lock tongue into a naturally locked position,
- the actuating lever being operatively engageable to the lock tongue such that operation of the handle causes the lock tongue to move to the unlocked position against the bias of the biasing means.

In a first version of the invention, there is provided a lock for a sliding window, the lock having:
- a lock body,
- a pivoting handle attached to the lock body, the handle having a projection which extends into the lock body,
- an actuating lever fixed on the projection such that the actuating lever pivots with the handle,
- a lock tongue which is separate from and outside the lock body, and which is slidably moveable on the window in an up and down manner between a locked position where the lock tongue engages with a strike, and a free position,
- biasing means to bias the lock tongue into a naturally locked position,
- the actuating lever being operatively engageable to the lock tongue such that operation of the handle causes the lock tongue to move to the unlocked position against the bias of the biasing means.

In a second and third version of the invention, there is provided a lock as described above including a handle locking means which comprises:
- an actuating member operable from the exterior of the lock body,
- a locking plate within the lock body and which can slide within the lock body, the actuating member engaging with the locking plate such that operation of the actuating member causes the locking plate to slide between a handle locking position where the plate engages with the actuating lever to prevent pivoting movement of the handle to unlock the lock tongue (and therefore keeping the lock tongue in the locked position) and a free position.

In a more particular second version of the invention, the actuating member in the lock as described immediately above is a key cylinder having an eccentric pin which extends into the lock body, the eccentric pin being engageable with the locking plate.

In a more particular third version of the invention, the actuating member in the lock described above is a snib having an eccentric pin which extends into the lock body, the eccentric pin being engageable with the locking plate.

In a fourth version of the invention, there is provided a lock for a sliding window, the lock having:
- a lock body,
- a pivoting handle attached to the lock body, the handle having a projection which extends into the lock body,
- an actuating lever fixed on the projection such that the actuating lever pivots with the handle,
- a lock tongue which is moveable between a locked position where the lock tongue engages with a strike, and a free position,
- biasing means to bias the lock tongue into a naturally locked position,
- the actuating lever being operatively engageable to the lock tongue such that operation of the handle causes the lock tongue to move to the unlocked position against the bias of the biasing means,
- a turnknob attached to the lock body and spaced from the pivoting handle,
- a locking plate within the lock body and which can slide within the lock body, the turnknob being operatively engaged to the locking plate such that operation of the turnknob causes the locking plate to slide between a handle locking position where the plate engages with the actuating lever to prevent pivoting movement of the handle to unlock the lock tongue (and therefore keeping the lock tongue in the locked position) and a free position,
- a key cylinder operatively associated with the locking plate to enable the locking plate to be deadlocked in the handle locking position.

In this fourth version, the lock tongue can be slidably moveable in an up and down manner between the locked position and the free position.

In a fifth version, there is provided a lock of any one of versions 2 to 4 additionally having the ability to be locked in a vent position, the lock additionally having:
- a vent rod external of the lock body and able to move vertically between an extended locking position where one end of the vent rod locks against part of the window or door surround frame,
- a vent rod guide to which the vent rod is attached,
- a vent rod guide actuating member which is inside the lock body and which is moveable between a first position where the actuating member moves the vent rod guides and therefore the vent rod into a locking position, and a second free position, the vent rod guide actuation member being operative attached to the locking plate such that movement of the locking plate to the locking position also moves the vent rod guide actuating member to its first (locking) position.

In a broad form of the invention, there is provided a lock for a sliding window, the lock having:

a lock body, a pivoting handle attached to the lock body, the handle having a projection which extends into the lock body, an actuating lever fixed on the projection such that the actuating lever pivots with the handle, a lock tongue which is moveable between a locked position where the lock tongue engages with a strike, and a free position, biasing means to bias the lock tongue into a naturally locked position, the actuating lever being operatively engageable to the lock tongue such that operation of the handle causes the lock tongue to move to the unlocked position against the bias of the biasing means.

BRIEF DESCRIPTION OF THE DRAWINGS

Embodiments of the various versions of the lock will be described with reference to the following drawings in which.

BEST MODE

Figure 1:
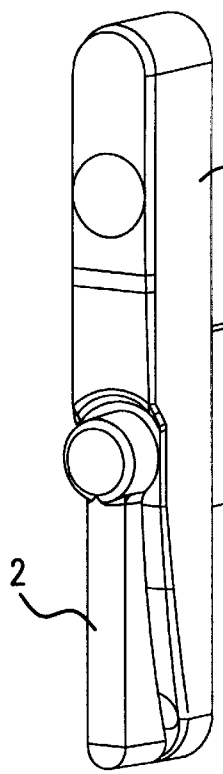
FIGS. 1 to 5 are perspective views of versions 1 to 5 of the lock respectively.
Figure 2:
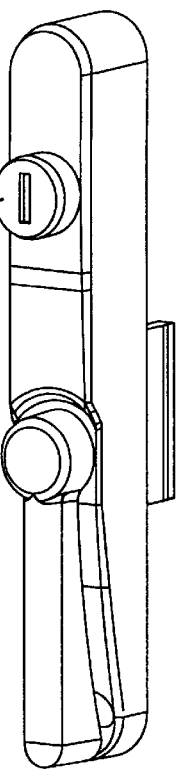
Figure 3:
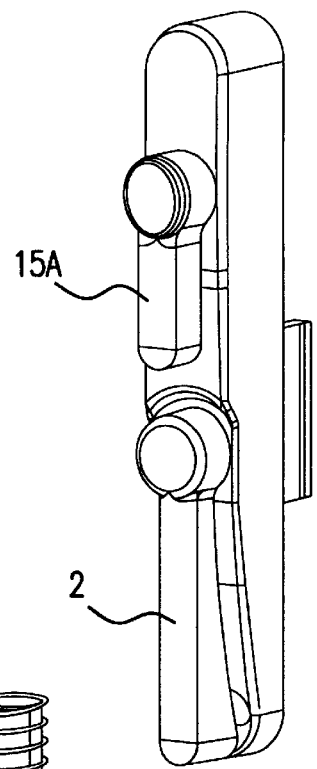
Figure 4:
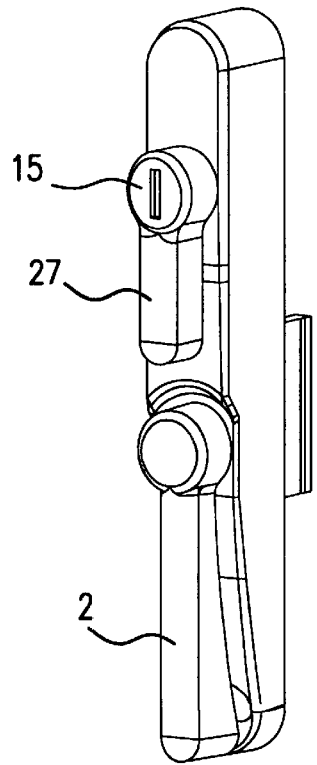

Initially, and with reference to FIGS. 1 to 4, there is illustrated the overall view of the front of the various lock versions.

The locks all have a lock body 1 which can be made of plastic or metal to suit. In the embodiment, the lock body has a length of approximately 17 cm and a width of approximately 2.5 cm. The thickness of the lock body varies along its length but is approximately 2 cm at its thicker portion and approximately 1 cm at its thinner (lower) portion.

Each lock has a pivoting handle 2 which in the embodiment is formed from plastic and which is thumb or finger operable.

Version 1 of the lock (FIG. 1) is a simple standard design and does nothing more than latch a sliding window to a strike.

Version 2 (FIG. 2) of the lock is similar to version 1 except that it now contains a five disc cylinder 15 which is key operable. As will be explained in greater detail below, cylinder 15 functions to lock handle 2 against pivoting movement and therefore locks the window to the strike.

Version 3 (FIG. 3) of the lock is similar to version 2 except that instead of a cylinder 15, there is provided a turn button 15A. The turnbutton can be turned by a thumb or finger again to lock handle to against pivoting movement.

Version 4 (FIG. 4) is, in essence, a combination of versions 2 and 3 in that it has a turnknob 27 which also has a key cylinder 15. This allows either turnknob 27 or key 15 to lock handle 2 against movement. When key cylinder 15 is used, the lock is essentially deadlocked.

Figure 5:
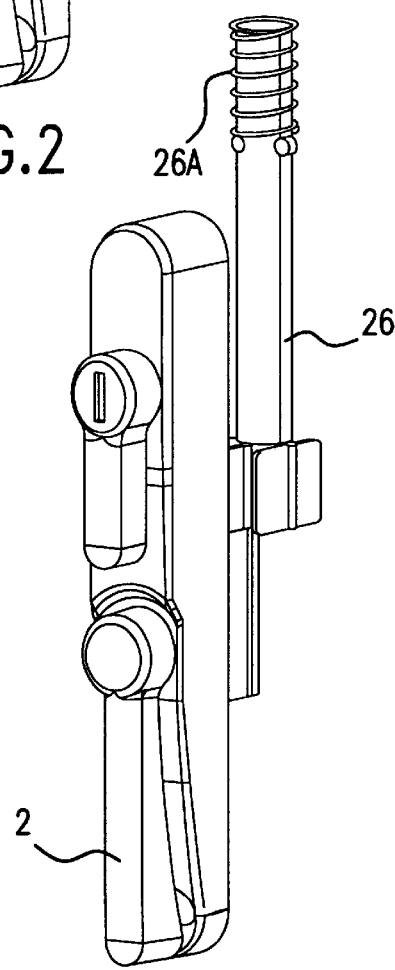

Version 5 (FIG. 5) is similar to version 4 except this lock includes the additional security of a vent rod 26 which can lock the sliding window in a partially open (vent) position.

Figure 6:
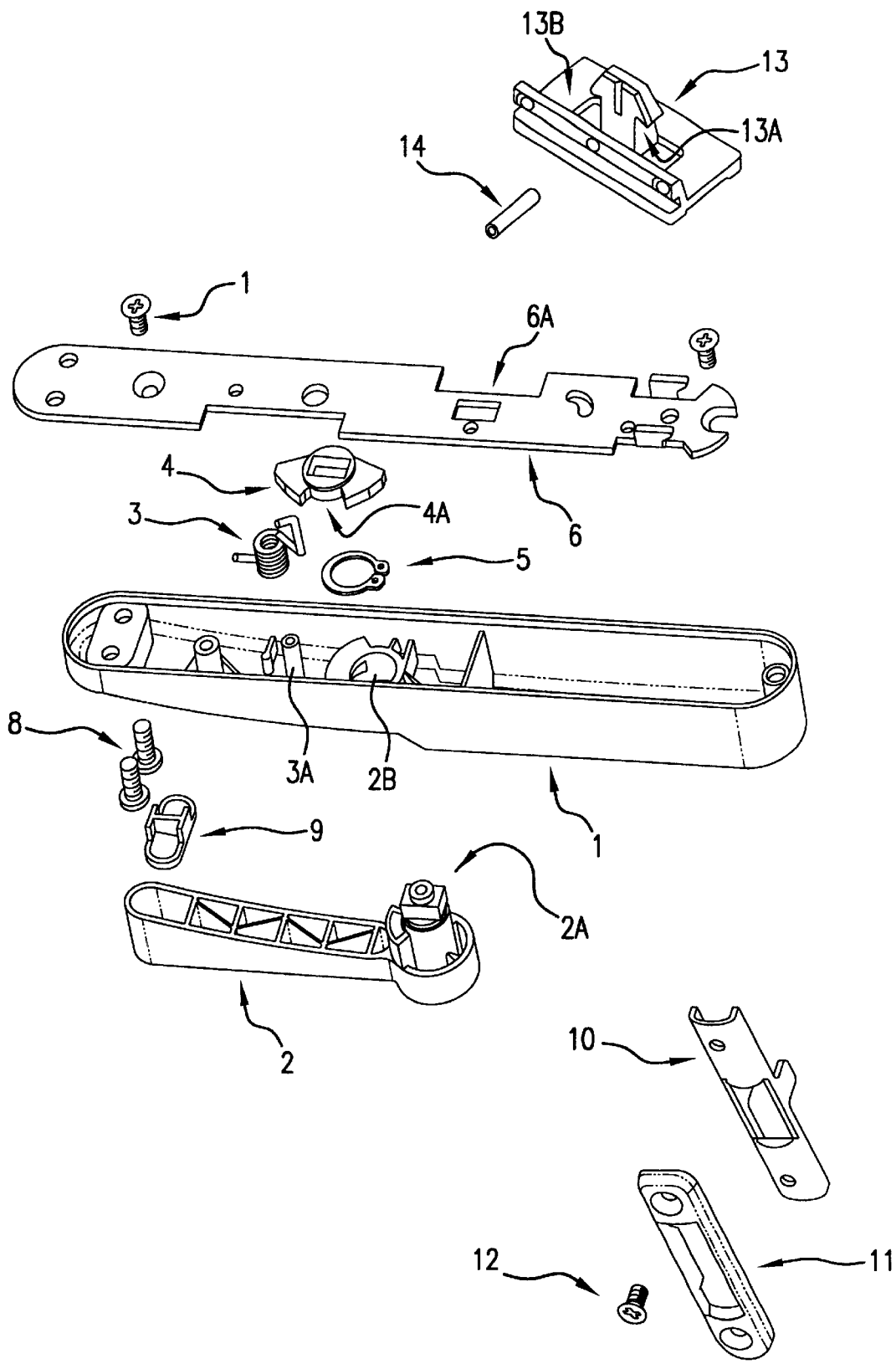
FIG. 6 is an exploded view of version 1 of the lock.

FIG. 6 shows greater detail of version 1 of the lock.

The lock body 1 is shown in inverted form and has a hollow interior formed with various screw holes, struts, and other mounting portions for the various components. Pivoting handle 2 has a projection 2A which extends through an aperture 2B in the lock body. Attached to projection 2A is an actuating lever 4 which in the embodiment is formed of plastic material. Actuating member 4 in the embodiment is formed separately to projection 2A and is press-fitted thereto. Handle 2 is attached to lock body 1 via a handle circlip 5 which attaches to a groove (not shown) extending about projection 2A.

Illustrated in FIG. 6 are a screw hole plug 9, and two lock fixing screws 8 which allows the lock to be fastened to the sliding window.

Also illustrated is a back plate 6 formed of metal which screws to the lock body via back plate fixing screws 7. The back plate has two hooks which attach the lock to the window, with screws 7 fastening the lock in place.

The lock includes a lock tongue 13 which has a nose portion 13A which is ramped on each end, and a slide back plate 13B. The nose portion and back plate are formed integrally with each other. The lock tongue 13 is slidably attached to an end edge of the window such that it can attach to a strike 10. Lock tongue 13 is outside of the lock body 1 but is operatively connected thereto by pin 14. That is, pin 14 couples the separate lock tongue 13 to the lock body 1. The lock tongue is also operatively connected to spring 3 (described in greater detail below), which biases the tongue 13 into a locked position.

Operatively attached to a rear portion of lock tongue 13 is a pin 14. Pin 14 is in lock body 1 and extends vertically in lock body 1 (in the orientation that lock body 1 is illustrated in FIG. 6). Pin 14 extends through the U-shaped cut-out 4A in lever 4. Thus, cut-out 4A partially surrounds a portion of pin 14. Pin 14 extends through recess 6A in back plate 6 to engage with lock tongue 13.

In use, handle 2 is pivoted by a person's finger or thumb which in turn causes rotation of lever 4. As pin 14 is within cut-out 4A, rotation of lever 4 will cause pin 14 to be pushed sideways. Stated differently, if the lock is in a vertical position, rotation of lever 4 will cause pin 14 to be pushed sideways but in an up and down motion. As pin 14 is operatively attached to lock tongue 13, lock tongue 13 is also pushed up or down.

The lock tongue 13 is biased into a naturally locking position by a biasing means in the form of spring 3. Spring 3 is of a helical type and extends about boss 3A. The lower leg of the spring 3 is secured to the lock body, while the upper kinked leg of spring 3 engages with lock tongue 13 to bias the lock tongue into a naturally locked position.

When the sliding window is closed, lock tongue 13 is biased into a naturally closed position. A strike assembly is provided on the window or door surround frame and in the embodiment, the strike assembly consists of strike 10, a strike cover 11, and strike fixing screws 12. As lock tongue 13 approaches the strike, the ramped nose portion of lock tongue 13 will initially contact the strike and this will cause the lock tongue to move to an unlocked position against the bias of the spring. Once the lock tongue is fully inserted into the strike such that the strike walls pass the ramped nose portion of the lock tongue, the spring will bias the lock tongue back into the closed locked position.

Handle 2 can then be turned to retract lock tongue 13 against the bias of the spring into the unlocked position which will allow the window or door to now be opened.

Figure 7:
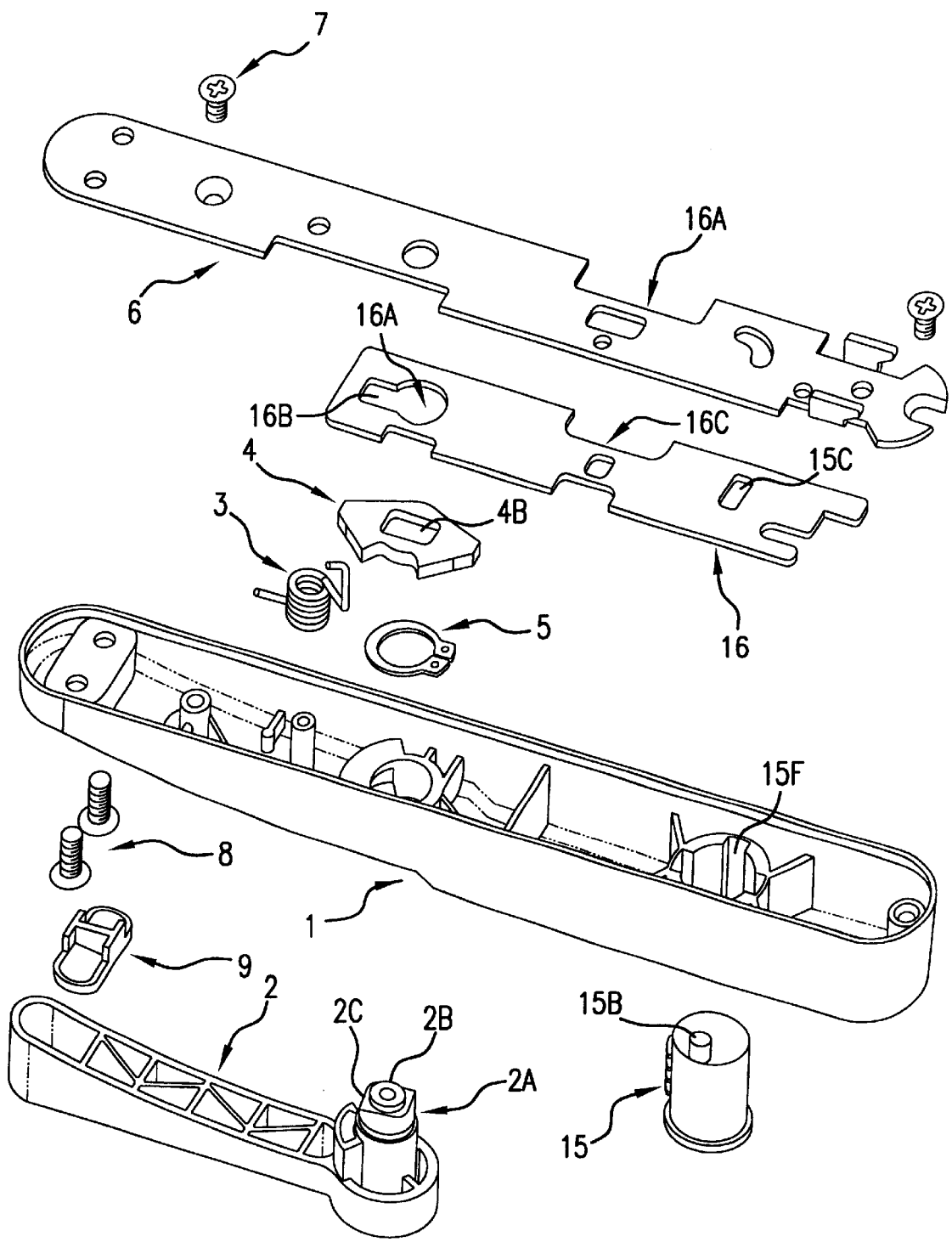
FIG. 7 is an exploded view of version 2 of the lock.

FIG. 7 illustrates an exploded view of version 2 of the lock. Briefly, this version is the same as the version illustrated in FIG. 6 except that it includes a disc cylinder. Therefore, like numbers have been used to refer to like parts.

In FIG. 7, the two new components are an actuating member operable from the exterior of the lock body and in the embodiment being in the form of a lock cylinder 15 and a locking plate 16.

Cylinder 15 extends through an opening 15F in lock body 1. Cylinder 15 has an eccentric pin 15B which is common for key cylinders. The locking plate 16 is formed of metal and has a particular configuration, details of which will be described in greater detail below. Locking plate 16 slides relative to lock body 1 between a locking position where locking plate 16 locks handle 2 against pivoting movement, and a free position where handle 2 can operate to unlock locking tongue 13. This is achieved as follows:

Eccentric pin 15B extends into rectangular cut-out 15C on locking plate 16. Therefore, upon insertion and rotation of a key in cylinder 15, eccentric pin 15B will rotate and will push locking plate 16 between extended and retracted positions.

The other end of locking plate 16 has a key hole-type slot 16A. The top of projection 2A on handle 2 has a round button 2B which sits on a rectangular shoulder 2C. Shoulder 2C extends through the rectangular opening 4B in lever 4 thereby causing lever 4 to rotate upon rotation of handle 2. Shoulder 2C is however of sufficient height to extend entirely through opening 4B and through or at least flush against the top of keyhole slot 16A. The shape of shoulder 2C allows it to pass into the smaller rectangular portion 16B of keyhole slot 16A. When shoulder 2C is in the rectangular portion 16B, handle 2 cannot be rotated as shoulder 2C locks against portion 16B. However, when shoulder 2C is in the larger round part of keyhole slot 16A, handle 2 can be rotated freely.

Locking plate 16 is reciprocates via pin 15B between a handle locking position where plate 16 has been moved such that shoulder 2C sits within portion 16B. Turning of the key in cylinder 15 in the other direction will cause plate 16 to reciprocate the other way which will now find shoulder 2C in the larger keyhole slot 16A which now allows the handle 2 to be turned.

As an additional locking function, plate 16 has a cut-out portion 16C through which pin 14 extends. When the plate is in the locking position, pin 14 is hard up against one of the edges of the cut-out which provides a second locking action against movement of lock tongue 13.

Figure 8:
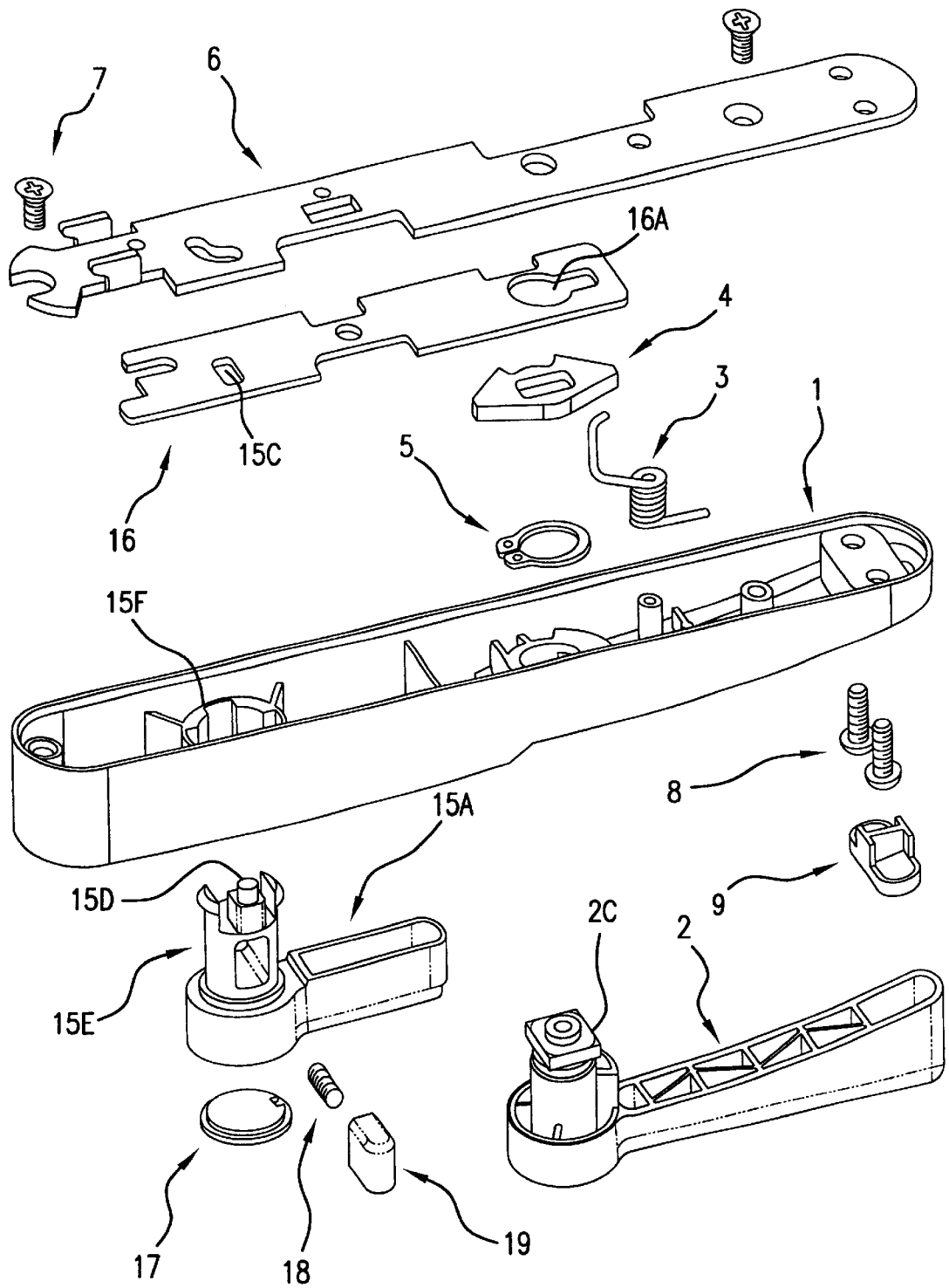
FIG. 8 is an exploded view of version 3 of the lock.

FIG. 8 shows the third version of the lock which is similar to the version described with reference to FIG. 7 except that the actuating member, instead of being a key cylinder, is a turnbutton 15A. The turnbutton 15A is provided with a decorative turnbutton plug 17. The turnbutton is spring biased by a slide spring 18 and a turnbutton slide 19. Turnbutton 15A has an eccentric pin 15D. Turnbutton 15A has a projection 15E which passes through an opening 15F in lock body 1. The remaining parts are similar to that described with reference to FIG. 7 in that eccentric pin 15D passes into cut-out 15C and again causes locking plate 16 to extend or retract in a slidable manner such that the keyhole slot 16A traps or frees the shoulder portion 2C on handle 2.

Figure 9:
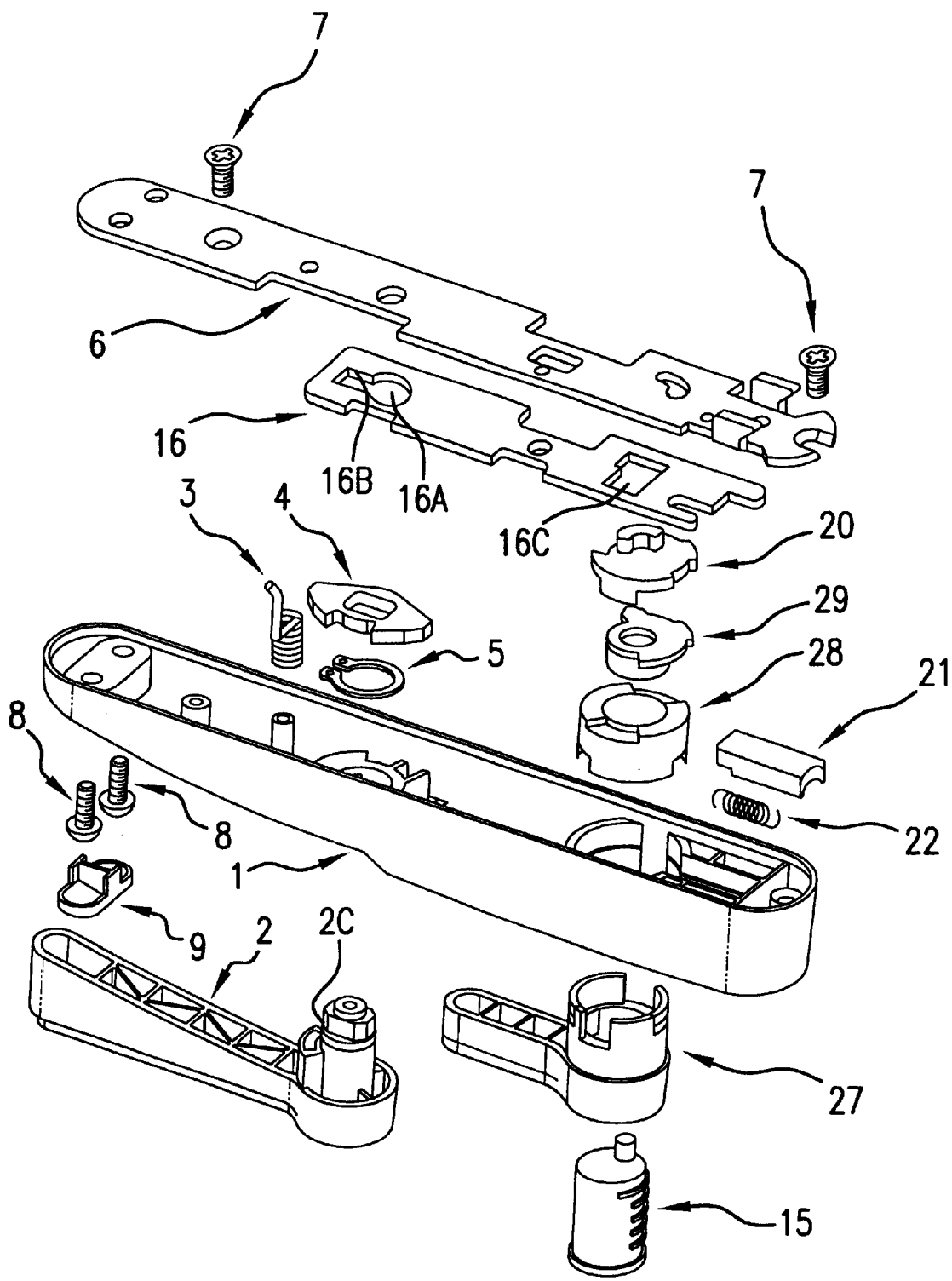
FIG. 9 is an exploded view of version 4 of the lock.

FIG. 9 illustrates version 4 of the invention which has a deadlocking capability. In this version, a turnknob 27 is provided which is rotatably mounted to lock body 1. Turnknob 27 has a hollow portion which accepts key cylinder 15. Associated with turnknob 27 is, in sequence, a turnknob extension 28 and unlocking cam 29, and a locking plate drive cam 20. Cam 20 extends through the larger rectangular hole 16C in locking plate 16. In this arrangement, turnknob 27 can be rotated 90° to a horizontal position which will cause locking plate 16 to slide to a position where shoulder portion 2C on handle 2 is locked into portion 16B of the keyhole 16A. Turnknob 27 can then be rotated back to its original position to unlock handle 2.

Turnknob 27 can be rotated 180° to the vertical (inverted position). In this position, the turnknob is deadlocked and can only be unlocked by insertion of a key into cylinder 15. FIG. 9 also illustrates a lock slide 21 and a lock slide spring 22.

Figure 10:
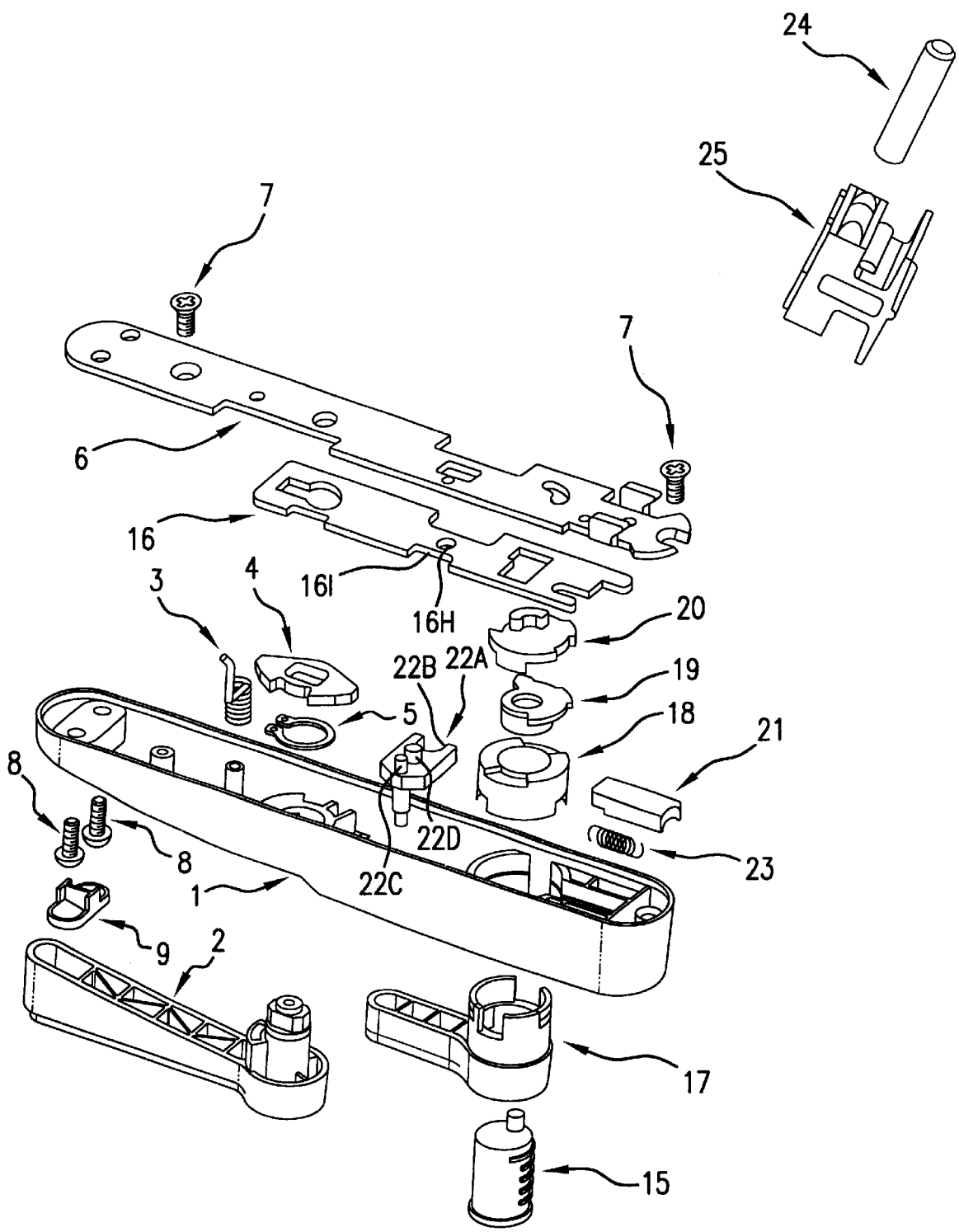
FIG. 10 is an exploded view of version 5 of the lock.

FIG. 10 illustrates version 5 of the lock which includes a vent rod.

In this arrangement, there is provided a vent rod 26 (illustrated in FIG. 5) which is formed of steel and which can have a terminal spring 26A, if desired, to assist in the unlocking process. The spring is however optional.

Rod 26 is attached to a rod guide 25 (see FIGS. 5 and 10) rod guide 25 being formed of moulded plastic or other suitable material. Rod guide 25 in turn is fitted with a lifting pin 24 which will be described in greater detail below.

Inside lock body 1 is a vent rod guide actuating member which in the embodiment is in the form of a lever 22A. Lever 22A pivots within body 1. Level 22A has a U-shaped cut-out portion 22B and the top of lever 22A is provided with two projecting buttons 22C, 22D. The purpose of the buttons will be described in greater detail below.

Cut-out portion 22B extends about lift pin 24 in such a way that rotation of lever 22A will cause pin 24 and therefore the attached rod guide 25 to move up and down. As the vent rod 26 is attached to rod guide 25, vent rod 26 will also be caused to move up and down between a vent locking and an unlocking position.

Lever 22A is turned by sliding movement of locking plate 16. This is achieved by having button 22D passing through opening 16H of locking plate 16 and button 22C being positioned in cut-out 16I of locking plate 16. Reciprocation of locking plate 16 by turnknob 17 will lock and unlock handle 2 in a manner already described, but will also cause rotation in either direction of lever 22A which in turn will lock or unlock vent rod 26.

I claim:
1. A lock for a sliding window, the lock having:
a lock body;
a pivoting handle attached to the lock body, the handle having a projection which extends into the lock body;
an actuating lever fixed on the projection such that the actuating lever pivots with the handle;
a lock tongue which is separate from and outside the lock body, and which is slidably moveable on the window in substantially vertical direction between a locked position where the lock tongue engages with a strike, and a free position;
biasing means at least partially in the lock body which engages with the lock tongue to bias the lock tongue into a naturally locked position;
a pin which has one end in the lock body and adapted to engage the actuating lever and another end extending out of the lock body and engaging with the lock tongue;
the actuating lever being operatively engageable to the pin such that operation of the handle causes the lock tongue to move to the unlocked position against the bias of the biasing means.

2. The lock of claim 1 including a handle locking means which comprises:

an actuating member operable from the exterior of the lock body;

a locking plate within the lock body and which can slide within the lock body, the actuating member engaging with the locking plate such that operation of the actuating member causes the locking plate to slide between a handle locking position where the plate engages with the pivoting handle to prevent pivoting movement of the handle to unlock the lock tongue and a free position.

3. The lock of claim 2, wherein the actuating member is a key cylinder having an eccentric pin which extends into the lock body, the eccentric pin being engageable with the locking plate.

4. The lock of claim 2, wherein the actuating member is a snib having an eccentric pin which extends into the lock body, the eccentric pin being engageable with the locking plate.

5. The lock of claim 2 which is able to be locked in a vent position, the lock additionally having:

a vent rod external of the lock body and able to move vertically between an extended locking position where one end of the vent rod locks against part of the window or door surround frame, a vent rod guide to which the vent rod is attached, a vent rod guide actuating member which is inside the lock body and which is moveable between a first position where the actuating member moves the vent rod guides and therefore the vent rod into a first locking position, and a second free position, the vent rod guide actuation member being operatively attached to the locking plate such that movement of the locking plate to the locking position also moves the vent rod guide actuating member to the first locking position.

6. The lock of claim 1, wherein the lock tongue is totally outside the lock body.

7. The lock of claim 2, wherein the lock tongue is totally outside the lock body.

8. The lock of claim 2 which is able to be locked in a vent position, the lock additionally having:

a vent rod external of the lock body and able to move vertically between an extended locking position where one end of the vent rod locks against part of the window or door surround frame, a vent rod guide to which the vent rod is attached, a vent rod guide actuating member which is inside the lock body and which is moveable between a first position where the actuating member moves the vent rod guides and therefore the vent rod into a first locking position, and a second free position, the vent rod guide actuation member being operatively attached to the locking plate such that movement of the locking plate to the locking position also moves the vent rod guide actuating member to the first locking position.

9. A lock for a sliding window, the lock having:

a lock body, a pivoting handle attached to the lock body, the handle having a projection which extends into the lock body, an actuating lever fixed on the projection such that the actuating lever pivots with the handle, a lock tongue which is separate from and outside the lock body, and which is slidably moveable in a substantially vertical direction between a lock position where the lock tongue engages with a strike, and a free position, biasing means to bias the lock tongue into a naturally locked position, the actuating lever being operatively engageable to the lock tongue such that operation of the handle causes the lock tongue to move to the unlocked position against the bias of the biasing means, a turnknob attached to the lock body and spaced from the pivot handle, a locking plate within the lock body and which can slide within the lock body, the turnknob being operatively engaged to the locking plate such that operation of the turnknob causes the locking plate to slide between a handle locking position where the plate engages with the actuating leer to prevent pivoting movement of the handle to unlock the lock tongue (and therefore keeping the lock tongue in the locked position) and a free position.

10. The lock of claim 9, wherein the lock tongue is totally outside the lock body.

11. The lock of claim 9 which is able to be locked in a vent position, the lock additionally having:

a vent rod external of the lock body and able to move vertically between an extended locking position where one end of the vent rod locks against part of the window or door surround frame, a vent rod guide to which the vent rod is attached, a vent rod guide actuating member which is inside the lock body and which is movable between a first position where the actuating member moves the vent rod guide and therefore the vent rod into a first locking position, and a second free position, the vent rod guide actuation member being operatively attached to the locking plate such that movement of the locking plate to the locking position also moves the vent rod guide actuating member to the first locking position.

* * * * *